(12) United States Patent
Kotani et al.

(10) Patent No.: US 9,601,808 B2
(45) Date of Patent: Mar. 21, 2017

(54) NONAQUEOUS ELECTROLYTIC SOLUTION CONTAINING GLYCOL SULFATE DERIVATIVE AND FLUOROETHYLENE CARBONATE AND LITHIUM ION SECONDARY BATTERY CONTAINING THE SAME

(71) Applicant: TDK CORPORATION, Tokyo (JP)

(72) Inventors: Kenta Kotani, Tokyo (JP); Atsushi Sano, Tokyo (JP)

(73) Assignee: TDK CORPORATION, Tokyo (JP)

(*) Notice: Subject to any disclaimer, the term of this patent is extended or adjusted under 35 U.S.C. 154(b) by 664 days.

(21) Appl. No.: 13/846,196

(22) Filed: Mar. 18, 2013

(65) Prior Publication Data

US 2013/0260261 A1    Oct. 3, 2013

(30) Foreign Application Priority Data

Mar. 27, 2012 (JP) ................. 2012-070947
Mar. 14, 2013 (JP) ................. 2013-051963

(51) Int. Cl.
*H01M 10/0569* (2010.01)
*H01M 10/0567* (2010.01)
*H01M 10/0525* (2010.01)

(52) U.S. Cl.
CPC ... *H01M 10/0569* (2013.01); *H01M 10/0567* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2003/0113636 A1* | 6/2003 | Sano et al. | 429/330 |
| 2007/0092802 A1 | 4/2007 | Ahn et al. | |
| 2011/0229770 A1 | 9/2011 | Yun et al. | |
| 2013/0004862 A1* | 1/2013 | Miyoshi | C07D 327/10 429/337 |

FOREIGN PATENT DOCUMENTS

| | | |
|---|---|---|
| JP | A-2000-003724 | 1/2000 |
| JP | A-2000-003725 | 1/2000 |
| JP | A-2007-128842 | 5/2007 |
| JP | A-2012-054231 | 3/2012 |

* cited by examiner

*Primary Examiner* — Ula C Ruddock
*Assistant Examiner* — Tony Chuo
(74) *Attorney, Agent, or Firm* — Oliff PLC

(57) ABSTRACT

A nonaqueous electrolytic solution includes a cyclic carbonate and a chain carbonate, and contains a glycol sulfate derivative represented by formula (I) below and fluoroethylene carbonate:

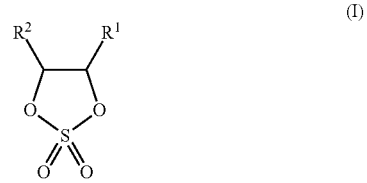

(I)

[wherein each of $R^1$ and $R^2$ independently represents at least one selected from the group consisting of a hydrogen atom and a hydrocarbon group having 1 to 5 carbon atoms].

7 Claims, 1 Drawing Sheet

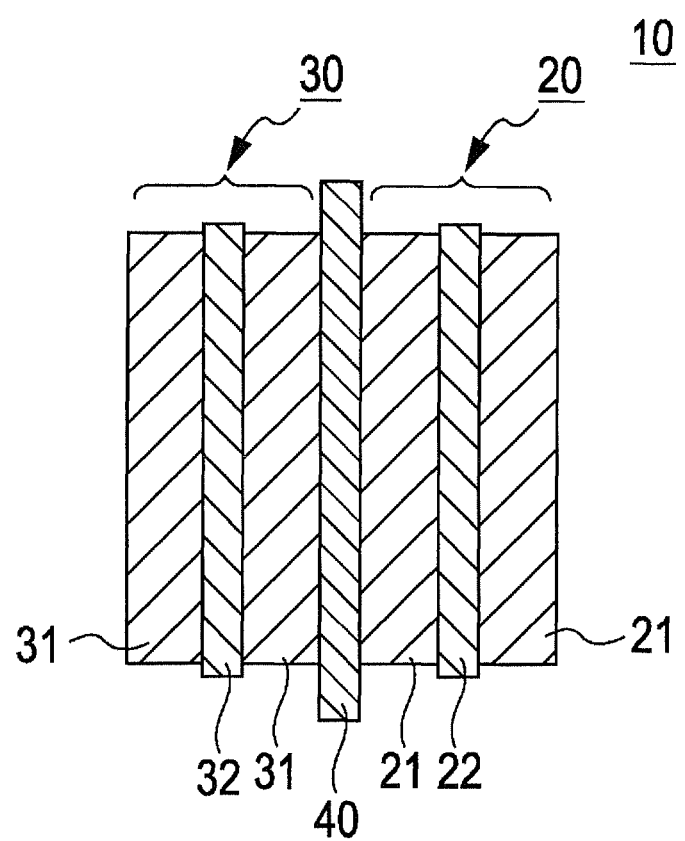

NONAQUEOUS ELECTROLYTIC SOLUTION CONTAINING GLYCOL SULFATE DERIVATIVE AND FLUOROETHYLENE CARBONATE AND LITHIUM ION SECONDARY BATTERY CONTAINING THE SAME

BACKGROUND

1. Technical Field

The present disclosure relates to a nonaqueous electrolytic solution, and a lithium ion secondary battery including the same.

2. Related Art

Lithium ion secondary batteries are lighter in weight and higher in capacity than nickel-cadmium batteries, nickel-metal hydride batteries, and the like. The lithium ion secondary battery has been therefore widely used as a power source for a mobile electronic appliance. Further, as the mobile electronic appliances decrease in size and increase in functionality in recent years, the lithium ion secondary battery has been expected to have further higher capacity. Not just for the mobile electronic appliances, furthermore, the high-capacity lithium ion secondary battery has been a strong candidate as a power source to be mounted on a hybrid vehicle, an electric vehicle, or the like. In addition, along with the recent size reduction and sophistication in functionality of mobile electronic appliances, the lithium ion secondary battery serving as a power source for these appliances has been expected to have further higher capacity. A lithium ion secondary battery mainly includes, for example, a positive electrode, a negative electrode, a separator, and a nonaqueous electrolytic solution. Various studies have been conducted for further improving the battery characteristics of the lithium ion secondary battery.

For example, the nonaqueous solvent in the nonaqueous electrolytic solution preferably has a relatively low melting point, a relatively high conductivity, and a relatively wide potential window (electrochemical window). It is also preferred that the nonaqueous solvent can be provided with high ion conductivity even at low temperature when an electrolyte is dissolved therein. From this viewpoint, therefore, propylene carbonate is preferably used as the nonaqueous solvent. However, when the negative electrode contains a carbon material such as highly crystallized graphite, there is a problem that the decomposition of propylene carbonate progresses at a cathode (electrode that serves as a negative electrode during discharging) especially during charging.

The progress in decomposition of propylene carbonate causes gas emission, and, with the gas emission, separation and/or decomposition of the carbon material of the negative electrode or the like occurs. This results in a problem that, during the usage, the battery characteristics such as capacity and charging/discharging cycle characteristics gradually deteriorate. Moreover, the progress in decomposition of propylene carbonate causes a decomposition product to be deposited on the negative electrode. This deposited material may further deteriorate the above battery characteristics.

It has therefore been proposed that 1,3-propane sultone or 1,4-butane sultone be added as a nonaqueous solvent to a nonaqueous electrolytic solution containing propylene carbonate (see, for example JP-A-2000-3724 and JP-A-2000-3725). The addition of such a nonaqueous electrolytic solution intends to suppress the progress of decomposition reaction of propylene carbonate as mentioned above.

SUMMARY

A nonaqueous electrolytic solution includes a cyclic carbonate and a chain carbonate, and contains a glycol sulfate derivative represented by formula (I) below and fluoroethylene carbonate:

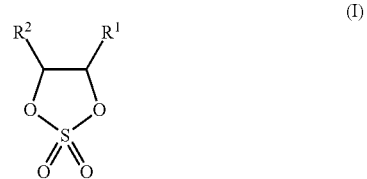

(I)

[wherein each of $R^1$ and $R^2$ independently represents at least one selected from the group consisting of a hydrogen atom and a hydrocarbon group having 1 to 5 carbon atoms].

BRIEF DESCRIPTION OF DRAWING

FIG. 1 is a schematic cross-sectional view depicting an exemplary lithium ion secondary battery according to an embodiment of the present disclosure.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the conventional lithium ion secondary battery as described in any of the above documents, especially one having a negative electrode containing a carbon material with a high graphitization degree, the decomposition of propylene carbonate is suppressed. Therefore, sufficient initial discharge capacity as a lithium ion secondary battery can be achieved. However, the secondary batteries according to those documents are difficult to have sufficient temperature characteristics. In particular, it is difficult for those secondary batteries to have sufficient capacity when the discharging is performed at low temperature. As a result, it is difficult for the secondary batteries to satisfy various characteristics of the secondary battery at the same time.

An object of the present disclosure is to provide a lithium ion secondary battery with well-balanced battery characteristics. In other words, this lithium ion secondary battery has excellent initial discharge capacity and sufficient discharge capacity at low temperature.

The present inventors have conducted intensive studies for achieving the above object. As a result, the present inventors have found out that the inclusion of a particular compound as a nonaqueous solvent in a nonaqueous electrolytic solution and the inclusion of a particular cyclic carbonate and a particular glycol sulfate derivative in this solution are extremely effective.

A nonaqueous electrolytic solution according to the present disclosure (a present nonaqueous electrolytic solution) includes a cyclic carbonate and a chain carbonate, and further contains a glycol sulfate derivative represented by formula (I) below and fluoroethylene carbonate. A lithium ion secondary battery including the present nonaqueous electrolytic solution can have excellent initial discharge capacity and sufficient discharge capacity at low temperature.

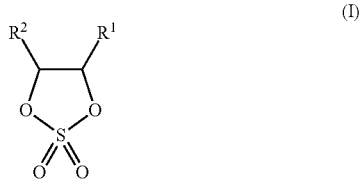

[In the formula (I), each of $R^1$ and $R^2$ independently represents at least one selected from the group consisting of a hydrogen atom and a hydrocarbon group having 1 to 5 carbon atoms.]

The glycol sulfate derivative in the present nonaqueous electrolytic solution desirably includes any of 1,3,2-dioxathiolane-2,2-dioxide, 4-methyl-1,3,2-dioxathiolane-2,2-dioxide, and 4-ethyl-1,3,2-dioxathiolane-2,2-dioxide. Thus, the lithium ion secondary battery including the present nonaqueous electrolytic solution can easily have excellent initial discharge capacity and more sufficient discharge capacity at low temperature.

Moreover, the present nonaqueous electrolytic solution desirably contains 0.5 wt % or more and 10 wt % or less of the glycol sulfate derivative and 0.1 wt % or more and 10 wt % or less of fluoroethylene carbonate. Thus, the lithium ion secondary battery including the present nonaqueous electrolytic solution can easily have more excellent initial discharge capacity and more sufficient discharge capacity at low temperature.

A lithium ion secondary battery according to the present disclosure (a present secondary battery) includes a positive electrode, a negative electrode, a separator, and a nonaqueous electrolytic solution. The nonaqueous electrolytic solution contains a cyclic carbonate and a chain carbonate, and further contains a glycol sulfate derivative represented by formula (I) below and fluoroethylene carbonate. The present secondary battery has excellent initial discharge capacity and sufficient discharge capacity at low temperature.

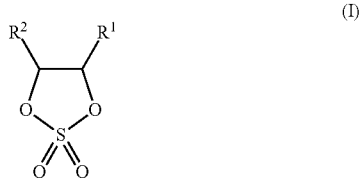

[In the formula (I), each of $R^1$ and $R^2$ independently represents at least one selected from the group consisting of a hydrogen atom and a hydrocarbon group having 1 to 5 carbon atoms.]

The glycol sulfate derivative in the nonaqueous electrolytic solution in the present secondary battery desirably includes any of 1,3,2-dioxathiolane-2,2-dioxide, 4-methyl-1,3,2-dioxathiolane-2,2-dioxide, and 4-ethyl-1,3,2-dioxathiolane-2,2-dioxide. Thus, the present secondary battery can easily have excellent initial discharge capacity and sufficient discharge capacity at low temperature.

Moreover, the nonaqueous electrolytic solution in the present secondary battery desirably contains 0.5 wt % or more and 10 wt % or less of the glycol sulfate derivative and 0.1 wt % or more and 10 wt % or less of fluoroethylene carbonate. Thus, the present secondary battery can have more excellent initial discharge capacity and sufficient discharge capacity at low temperature.

The present nonaqueous electrolytic solution includes a particular cyclic carbonate and a particular glycol sulfate derivative. Thus, the present secondary battery including the present nonaqueous electrolytic solution can have excellent initial discharge capacity and more sufficient discharge capacity at low temperature.

A preferred embodiment of the present disclosure is described with reference to the attached drawing. However, the present nonaqueous electrolytic solution and the present secondary battery are not limited to the embodiment below. The dimension ratio of the present secondary battery is not limited to the shown one.

(Lithium Ion Secondary Battery)

FIG. 1 schematically depicts a lithium ion secondary battery 10 according to this embodiment. The lithium ion secondary battery 10 in FIG. 1 includes a positive electrode 20 containing a positive electrode active material, a negative electrode 30 containing a negative electrode active material, and a separator 40. Each of the positive electrode active material and the negative electrode active material includes a material that intercalates and deintercalates lithium ions. The separator 40 is disposed between the positive electrode and the negative electrode. The separator 40 holds a nonaqueous electrolytic solution according to this embodiment. The positive electrode 20 includes a positive electrode current collector 22 and positive electrode active material layers 21 disposed on both surfaces the positive electrode current collector 22. The negative electrode 30 includes a negative electrode current collector 32 and negative electrode active material layers 31 disposed on both surfaces the negative electrode current collector 32.

(Negative Electrode)

The negative electrode 30 includes the negative electrode current collector 32 and the negative electrode active material layers 31 disposed on both surfaces the negative electrode current collector 32. The negative electrode active material layer 31 is formed by applying a coating to the negative electrode current collector 32. Here, the coating includes the negative electrode active material, a conductive auxiliary agent, and a binder.

The negative electrode active material includes at least one selected from carbon materials such as natural graphite and synthetic graphite (such as hard carbon, soft carbon, or low temperature heat-treated carbon). The interlayer distance d002 of the carbon material preferably ranges from 0.335 to 0.338 nm. The size Lc002 of a crystallite of the carbon material preferably ranges from 30 to 120 nm. Examples of the carbon material satisfying these conditions include synthetic graphite and MCF (mesocarbon fiber). Note that the interlayer distance d002 and the size Lc002 of the crystallite can be obtained by an X-ray diffraction method. Alternatively, a known material may be used as the negative electrode active material. Examples of this material include: metals, such as Al, Si, and Sn; which can form compounds with lithium; and amorphous compounds, such as $SiO_2$ and $SnO_2$; which mainly contain oxide and lithium titanate ($Li_4Ti_5O_{12}$). Alternatively, the negative electrode active material may include a mixture of these materials.

The conductive auxiliary agent is not specifically limited, and it may be any of the conductive auxiliary agents. The conductive auxiliary agent contains, for example, a carbon material such as carbon blacks, a fine powder of metal such as copper, nickel, stainless steel, or iron, a mixture of the carbon material and the fine powder of metal, or a conductive oxide such as ITO.

The conductive auxiliary agent may be, for example, a carbon material. Examples of the carbon material include pyrocarbon such as carbon black, coke, glassy carbon, organic polymer compound sintered materials, carbon fiber, and activated carbon. Moreover, as the conductive auxiliary agent, the negative electrode active material such as hard carbon, soft carbon, or graphite whose shape has been changed may be added.

The carbon black is preferably acetylene black, Ketjen black, or the like, and particularly preferably Ketjen black. The negative electrode active material preferably contains an electronically conductive porous body. This allows the formation of pores at the interface between the binder and the particles of the negative electrode active material. The pores facilitate the penetration of the nonaqueous electrolytic solution into the negative electrode active material layer.

The binder is not specifically limited as long as it allows the particles of the negative electrode active material and the particles of the conductive auxiliary agent to be bound together. Examples of the binder include fluorine resins such as polyvinylidene fluoride (PVDF), polytetrafluoroethylene (PTFE), tetrafluoroethylene-hexafluoropropylene copolymer (FEP), tetrafluoroethylene-perfluoroalkylvinylether copolymer (PFA), ethylene-tetrafluoroethylene copolymer (ETFE), polychlorotrifluoroethylene (PCTFE), ethylene-chlorotrifluoroethylene copolymer (ECTFE), and polyvinyl fluoride (PVF). This binder not only binds the particles of the negative electrode active material and the particles of the conductive auxiliary agent but also contributes to the binding between the negative electrode current collector 32 and the negative electrode active material layer 31.

The negative electrode current collector 32 may be any of known metal foils used as current collectors for lithium ion secondary batteries. Specifically, the negative electrode current collector 32 is preferably a copper foil.

(Positive Electrode)

The positive electrode 20 includes the positive electrode current collector 22 and the positive electrode active material layers 21 disposed on both surfaces the positive electrode current collector 22. The positive electrode active material layer 32 is formed by applying a coating to the positive electrode current collector. Here, the coating includes the positive electrode active material, the conductive auxiliary agent, and the binder.

Any material can be used as the positive electrode active material as long as the material can intercalate and deintercalate lithium ions, perform intercalation and deintercalation of lithium ions, or perform reversible doping and de-doping of lithium ions and counter anions of the lithium ions (for example, $ClO^{4-}$). The positive electrode active material may be a known electrode active material. The positive electrode active material may be, for example, a composite metal oxide. Examples of the composite metal oxide include lithium cobaltate ($LiCoO_2$), lithium nickelate ($LiNiO_2$), lithium manganese spinel ($LiMn_2O_4$), a composite metal oxide represented by the general formula: $LiNi_xCo_yMn_zO_2$ (x+y+z=1), a lithium vanadium compound ($LiV_2O_5$, $LiVPO_4$, $LiV_2(PO_4)_3$, $LiVOPO_4$), olivine type $LiMPO_4$ (wherein M represents Co, Ni, Mn, Fe, or V), and lithium titanate ($Li_4Ti_5O_{12}$).

The components of the positive electrode active material layer 21 other than the positive electrode active material, such as the conductive auxiliary agent and the binder, may be formed using materials similar to the materials used for the negative electrode. Therefore, similarly, the binder included in the positive electrode not only binds the particles of the positive electrode active material and the particles of the conductive auxiliary agent but also contributes to the binding between the positive electrode current collector 22 and the positive electrode active material layer 21.

The positive electrode current collector 22 may be any of known metal foils used as current collector s for lithium ion secondary batteries. Specifically, the positive electrode current collector 22 is preferably an aluminum foil.

(Separator)

The separator 40 may be an insulating porous body. The material, production method, and the like of the separator 40 are not particularly limited. The separator 40 may be a separator used for a known lithium ion secondary battery. The insulating porous body may be, for example, a known polyolefin resin. This polyolefin resin may be, for example, a crystalline homopolymer or copolymer. These polymers can be obtained by, for example, polymerizing polyethylene, polypropylene, 1-butene, 4-methyl-1-pentene, 1-hexene, or the like. The separator 40 may include one of these homopolymer and copolymer, or a mixture including two or more kinds of these homopolymer and copolymer. The separator 40 may have either a single layer or a plurality of layers.

(Nonaqueous Electrolytic Solution)

The nonaqueous electrolytic solution includes, as the nonaqueous solvent, a cyclic carbonate and a chain carbonate. Examples of the cyclic carbonate include ethylene carbonate, propylene carbonate, and butylene carbonate. The cyclic carbonate may be a mixture of two or more of the above materials.

Examples of the chain carbonate include dimethyl carbonate and ethyl methyl carbonate. The chain carbonate may be a mixture of two or more of the above materials. Alternatively, the chain carbonate may be a mixture including any of methyl acetate, ethyl acetate, methyl propionate, ethyl propionate, γ-butyrolactone, 1,2-dimethoxyethane, and 1,2-diethoxyethane.

The volume ratio between the cyclic carbonate and the chain carbonate in the nonaqueous solvent is preferably in the range of 3:7 to 1:1.

Various solutes are applicable as the electrolyte of the nonaqueous solvent. Examples of the electrolyte include $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and $LiPF_6$. These solutes may be use in a combination of two or more.

Above all, from the viewpoint of the conductivity, the electrolyte particularly preferably contains $LiPF_6$. When $LiPF_6$ is dissolved in the nonaqueous solvent, the concentration of the solute in the nonaqueous electrolytic solution is preferably adjusted in the range of 0.5 to 2.0 M (mol/L). When the concentration of the solute is less than 0.5 M, it may be difficult to secure sufficient conductivity of the nonaqueous electrolytic solution. This may result in the failure in achieving sufficient capacity during charging and discharging the lithium ion secondary battery 10. Meanwhile, when the concentration of the solute is more than 2.0 M, the viscosity of the nonaqueous electrolytic solution rises. The mobility of lithium ions therefore tends to decrease. This may result in the failure in achieving sufficient capacity during charging and discharging the lithium ion secondary battery 10 in a manner similar to the above.

The nonaqueous electrolytic solution further contains a glycol sulfate derivative represented by formula (I) below and fluoroethylene carbonate:

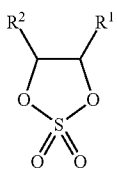

(I)

[wherein each of R¹ and R² independently represents at least one selected from the group consisting of a hydrogen atom, and a hydrocarbon group having 1 to 5 carbon atoms].

Examples of the glycol sulfate derivative include 1,3,2-dioxathiolane-2,2-dioxide, 4-methyl-1,3,2-dioxathiolane-2,2-dioxide, and 4-ethyl-1,3,2-dioxathiolane-2,2-dioxide.

Moreover, the content of the glycol sulfate derivative in the nonaqueous electrolytic solution is preferably 0.5 to 10 wt % relative to 100 wt % of the entire nonaqueous electrolytic solution. The content thereof is more preferably 1 to 7 wt % and further preferably 1 to 4 wt %.

The content of fluoroethylene carbonate in the nonaqueous electrolytic solution is preferably 0.1 to 10 wt % relative to 100 wt % of the entire nonaqueous electrolytic solution. The content thereof is more preferably 0.5 to 5 wt % and further preferably 1 to 3 wt %.

The positive electrode and the negative electrode produced in this manner are stacked or wound with the separator interposed therebetween. The positive electrode, the negative electrode, and the separator are inserted in an exterior body (not shown) as a battery element of the lithium ion secondary battery 10.

The exterior body has the battery element corresponding to the laminate including the positive electrode, the negative electrode, and the separator sealed therein. The configuration of this exterior body is not particularly limited. The exterior body may be an aluminum or stainless steel can, or an aluminum laminated packaging bag.

In general, after the battery element is inserted into this exterior body, the distinctive nonaqueous electrolytic solution according to this embodiment is poured into the exterior body. This nonaqueous electrolytic solution is held in the separator. Consequently, by sealing the exterior body under vacuum, the lithium ion secondary battery 10 is completed.

EXAMPLES

The embodiment is more specifically described with reference to examples and comparative examples. Note that the present disclosure is not limited to these examples.

Example 1

According to the following procedure, lithium ion secondary batteries having a similar configuration to that of the lithium ion secondary battery 10 depicted in FIG. 1 were produced, each five batteries being used in each of Examples 1 to 43 and Comparative Examples 1 to 4.

First, the negative electrode was produced. In the production of the negative electrode, first, synthetic graphite (90 parts by mass) as the negative electrode active material, carbon black (2 parts by mass) as the conductive auxiliary agent, and polyvinylidene fluoride (hereinafter referred to as PVDF) (8 parts by mass) as the binder were mixed. The resulting mixture was dispersed in a solvent, N-methyl-2-pyrrolidone (hereinafter referred to as NMP) to give a slurry. The obtained slurry was applied to an electrolyte copper foil as the current collector by a doctor blade method, and then dried at 110° C. After the drying, the current collector was rolled. Thus, the negative electrode was obtained.

Next, the positive electrode was produced. In the production of the positive electrode, first, $LiNi_{(x=1/3)}Co_{(y=1/3)}Mn_{(z=1/3)}O_2$ (90 parts by mass) as the positive electrode active material, carbon black (6 parts by mass) as the conductive auxiliary agent, and PVDF (4 parts by mass) as the binder were mixed. The resulting mixture was dispersed in NMP to give a slurry. The obtained slurry was applied to an aluminum foil as the current collector, and then dried. After the drying, the current collector was rolled. Thus, the positive electrode was obtained.

Next, the nonaqueous electrolytic solution was prepared. The solution was obtained by mixing ethylene carbonate and diethyl carbonate at a volume ratio of 3:7. $LiPF_6$ was added to this solution at a proportion of 1.0 mol/dm$^{-3}$. Further, to this solution were added 0.2 wt % of 1,3,2-dioxathiolane-2,2-dioxide (hereinafter referred to as DTD in some cases) as a compound A and 1 wt % of fluoroethylene carbonate (hereinafter referred to as FEC in some cases) as a compound B. Thus, the nonaqueous electrolytic solution was obtained.

A separator including polyethylene was held between the negative electrode and the positive electrode that were produced as described above. Therefore, the laminate (battery element) was obtained. The obtained laminate was put into an aluminum laminated package. Into this aluminum laminated package, the nonaqueous electrolytic solution was poured. Consequently, the aluminum laminated package was sealed under vacuum. Thus, the lithium ion secondary battery (60 mm in vertical length, 85 mm in horizontal length, and 3 mm in thickness) was produced.

Note that a laminate film was used as the aluminum laminated package. In this laminate film, a layer of synthetic resin (layer containing modified polypropylene), a metal layer including an aluminum foil, and a layer containing polyamide were stacked in this order. In this laminate film, the layer of synthetic resin was in contact with the nonaqueous electrolytic solution. By overlapping two of the laminate films and by thermally compressing edges of these films, the aluminum laminated package was produced.

Examples 2 to 43 and Comparative Examples 1 to 4

Lithium ion secondary batteries were produced in a manner similar to Example 1, each five batteries being used in each of Examples 2 to 43 and Comparative Examples 1 to 4, except that the kind and the addition amount of the compound A and the addition amount of the compound B (FEC), which were added to the nonaqueous electrolytic solution, were changed as shown in Table 1. In Table 1, MDTD stands for 4-methyl-1,3,2-dioxathiolane-2,2-dioxide and EDTD stands for 4-ethyl-1,3,2-dioxathiolane-2,2-dioxide.

The battery characteristics of the lithium ion secondary batteries according to Examples 1 to 43 and Comparative Examples 1 to 4 were evaluated. The values of the battery characteristics in Table 1 each represent the mean value of the battery characteristics obtained from the five lithium ion secondary batteries.

(Discharge Capacity Evaluation Test)

Initial charging was performed on the lithium ion secondary battery under an environment set at 25° C. in a thermostat chamber. After a rest of 10 minutes, discharging was performed. The amount of discharge (initial discharge capacity) from this discharging was evaluated. Note that the charging was performed at a constant current and a constant voltage at 30 mA up to 4.2 V. The discharging was performed at constant current at 30 mA down to 2.5 V. The initial discharge capacity (mAh) in the initial discharging is expressed as the battery characteristics in Table 1. As is clear from Table 1, it was confirmed that each of the lithium ion secondary batteries according to Examples 1 to 43 has practically sufficient battery capacity.

(Low-Temperature Charging/Discharging Evaluation Characteristics)

The discharging characteristic in a low-temperature region was evaluated. In this evaluation, the lithium ion secondary battery was put into a thermostat chamber set at −10° C. After two hours, the lithium ion secondary battery was charged at a constant current and a constant voltage at 30 mA up to 4.2 V. After a rest of 10 minutes, discharging of the lithium ion secondary battery was performed. This discharging was performed at constant current at 30 mA down to 2.5 V. The discharge capacity (mAh) at −10° C. is expressed as −10° C. capacity in Table 1.

TABLE 1

| | Compound A | Compound A content (wt %) | Compound B | Compound B content (wt %) | battery capacity (mAh) | −10° C. capacity (mAh) |
|---|---|---|---|---|---|---|
| Example 1 | DTD | 0.2 | FEC | 1 | 139 | 68 |
| Example 2 | MDTD | 0.2 | FEC | 3 | 135 | 67 |
| Example 3 | DTD | 0.5 | FEC | 1 | 151 | 74 |
| Example 4 | DTD | 0.5 | FEC | 3 | 152 | 78 |
| Example 5 | DTD | 1 | FEC | 0.1 | 145 | 77 |
| Example 6 | DTD | 1 | FEC | 0.5 | 152 | 85 |
| Example 7 | DTD | 1 | FEC | 1 | 153 | 94 |
| Example 8 | DTD | 1 | FEC | 2 | 154 | 96 |
| Example 9 | DTD | 1 | FEC | 3 | 155 | 96 |
| Example 10 | DTD | 1 | FEC | 4 | 154 | 88 |
| Example 11 | MDTD | 1 | FEC | 4 | 152 | 84 |
| Example 12 | EDTD | 1 | FEC | 4 | 151 | 82 |
| Example 13 | DTD | 1 | FEC | 5 | 154 | 86 |
| Example 14 | DTD | 1 | FEC | 7 | 147 | 77 |
| Example 15 | DTD | 1 | FEC | 10 | 142 | 72 |
| Example 16 | DTD | 1 | FEC | 12 | 138 | 66 |
| Example 17 | DTD | 1 | FEC | 15 | 137 | 65 |
| Example 18 | DTD | 2 | FEC | 1 | 153 | 93 |
| Example 19 | DTD | 2 | FEC | 3 | 155 | 95 |
| Example 20 | EDTD | 4 | FEC | 0.1 | 144 | 73 |
| Example 21 | DTD | 4 | FEC | 0.5 | 151 | 85 |
| Example 22 | DTD | 4 | FEC | 1 | 152 | 93 |
| Example 23 | DTD | 4 | FEC | 2 | 154 | 95 |
| Example 24 | DTD | 4 | FEC | 3 | 154 | 93 |
| Example 25 | MDTD | 4 | FEC | 3 | 151 | 91 |
| Example 26 | EDTD | 4 | FEC | 3 | 150 | 90 |
| Example 27 | DTD | 4 | FEC | 4 | 153 | 88 |
| Example 28 | DTD | 4 | FEC | 5 | 152 | 86 |
| Example 29 | DTD | 4 | FEC | 7 | 146 | 76 |
| Example 30 | DTD | 4 | FEC | 10 | 142 | 71 |
| Example 31 | DTD | 4 | FEC | 12 | 137 | 67 |
| Example 32 | DTD | 4 | FEC | 15 | 136 | 66 |
| Example 33 | DTD | 5 | FEC | 1 | 152 | 88 |
| Example 34 | DTD | 5 | FEC | 3 | 152 | 89 |
| Example 35 | DTD | 7 | FEC | 1 | 151 | 85 |
| Example 36 | DTD | 7 | FEC | 3 | 151 | 86 |
| Example 37 | MDTD | 10 | FEC | 1 | 143 | 71 |
| Example 38 | DTD | 10 | FEC | 3 | 147 | 72 |
| Example 39 | MDTD | 10 | FEC | 3 | 144 | 70 |
| Example 40 | DTD | 12 | FEC | 1 | 138 | 68 |
| Example 41 | DTD | 12 | FEC | 3 | 139 | 68 |
| Example 42 | DTD | 15 | FEC | 1 | 137 | 65 |
| Example 43 | DTD | 15 | FEC | 1 | 137 | 66 |
| Comparative Example 1 | — | 0 | — | 0 | 130 | 59 |
| Comparative Example 2 | — | 0 | FEC | 1 | 133 | 60 |
| Comparative Example 3 | MDTD | 1 | FEC | 0 | 130 | 56 |
| Comparative Example 4 | DTD | 4 | — | 0 | 132 | 60 |

As indicated in Table 1, the lithium ion secondary batteries according to Examples 1 to 43 each contain DTD or another glycol sulfate derivative as the compound A and FEC as the compound B. Thus, the lithium ion secondary batteries according to Examples 1 to 43 can have excellent battery capacity and sufficient discharge capacity at a low temperature of −10° C. Moreover, it is found that the battery characteristics can be further improved when the nonaqueous electrolytic solution contains 0.5 wt % or more and 10 wt % or less of the compound A and 0.1 wt % or more and 10 wt % or less of the compound B.

As described above, according to the present disclosure, the lithium ion secondary battery with excellent initial discharge capacity and operating sufficiently even in the low-temperature region can be provided.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A nonaqueous electrolytic solution comprising:
a cyclic carbonate and a chain carbonate;
a glycol sulfate derivative represented by formula (I) below; and
fluoroethylene carbonate:

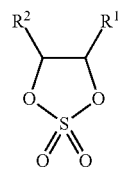

(I)

wherein:
each of $R^1$ and $R^2$ independently represents at least one selected from the group consisting of a hydrogen atom and a hydrocarbon group having 1 to 5 carbon atoms;
the glycol sulfate derivative is present in an amount in a range of from 1 to 4 wt. %; and
the fluoroethylene carbonate is present in an amount in a range of from 1 to 3 wt. %.

2. The nonaqueous electrolytic solution according to claim 1, wherein the glycol sulfate derivative includes any of 1,3,2-dioxathiolane-2,2-dioxide, 4-methyl-1,3,2-dioxathiolane-2,2-dioxide, and 4-ethyl-1,3,2-dioxathiolane-2,2-dioxide.

3. A lithium ion secondary battery comprising:
a positive electrode;
a negative electrode;
a separator; and
a nonaqueous electrolytic solution comprising:
  a cyclic carbonate and a chain carbonate,
  a glycol sulfate derivative represented by formula (I) below, and
  fluoroethylene carbonate:

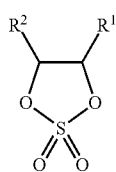

(I)

wherein:
  each of $R^1$ and $R^2$ independently represents at least one selected from the group consisting of a hydrogen atom and a hydrocarbon group having 1 to 5 carbon atoms;
  the glycol sulfate derivative is present in the nonaqueous electrolytic solution in an amount in a range of from 1 to 4 wt. %; and
  the fluoroethylene carbonate is present in the nonaqueous electrolytic solution in an amount in a range of from 1 to 3 wt. %.

4. The lithium ion secondary battery according to claim 3, wherein the glycol sulfate derivative includes any of 1,3,2-dioxathiolane-2,2-dioxide, 4-methyl-1,3,2-dioxathiolane-2,2-dioxide, and 4-ethyl-1,3,2-dioxathiolane-2,2-dioxide.

5. The nonaqueous electrolytic solution according to claim 1, wherein the glycol sulfate derivative is 1,3,2-dioxathiolane-2,2-dioxide.

6. The lithium ion secondary battery according to claim 3, wherein the glycol sulfate derivative is 1,3,2-dioxathiolane-2,2-dioxide.

7. The lithium ion secondary battery according to claim 3, wherein the battery has an improved discharge capacity at a temperature of −10° C.

* * * * *